United States Patent [19]
Vanover

[11] 3,857,583
[45] Dec. 31, 1974

[54] OCCUPANT PROPELLED QUADRACYCLE
[76] Inventor: Henry R. Vanover, 822 Highmoor St., Stockton, Calif. 95207
[22] Filed: May 18, 1973
[21] Appl. No.: 361,615

[52] U.S. Cl. .................................... 280/282
[51] Int. Cl. ............................... B62k 9/00
[58] Field of Search ......... 280/282, 79.1, 7.1, 7.15, 280/80 R, 87 R

[56] References Cited
UNITED STATES PATENTS
| | | | |
|---|---|---|---|
| 1,804,541 | 5/1931 | Perin | 280/79.1 |
| 2,207,161 | 7/1940 | Roe | 280/282 |
| 2,423,590 | 7/1947 | Fageol | 280/282 |
| 2,548,749 | 4/1951 | Stout | 280/282 |
| 3,062,559 | 11/1962 | Hewitt | 280/282 |

*Primary Examiner*—Robert R. Song
*Attorney, Agent, or Firm*—Blair & Brown

[57] ABSTRACT

An occupant propelled quadracycle including a frame, a pedal driven steerable front wheel, a pair of outrigger caster wheels supported on the frame and a rear wheel having castering capability with a hand actuated lock to lock the rear wheel in a straight line position aligned with the steerable front wheel at the option of the occupant. The occupant seat is mounted on the frame at a point slightly above the castering wheels.

4 Claims, 10 Drawing Figures

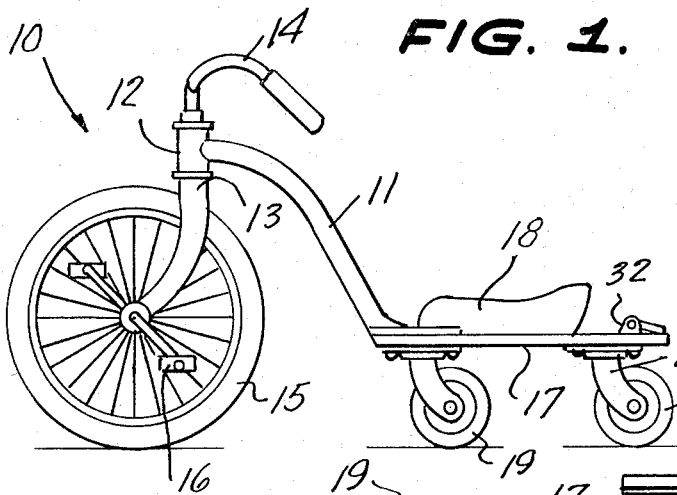
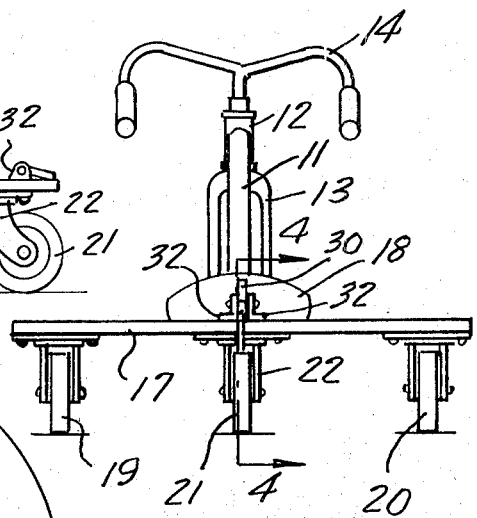
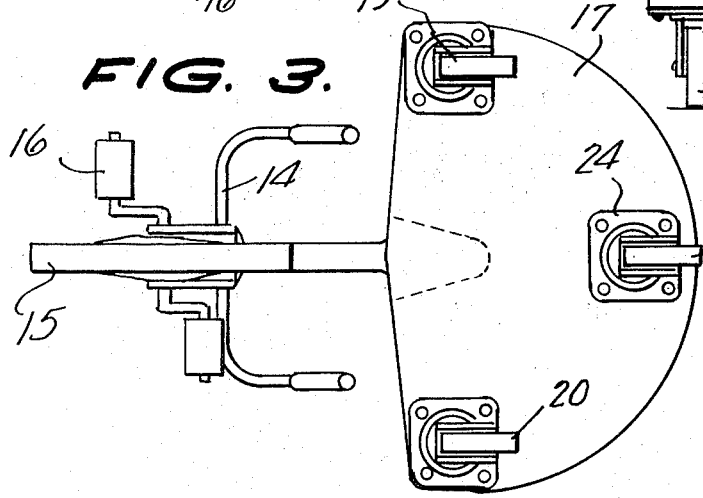
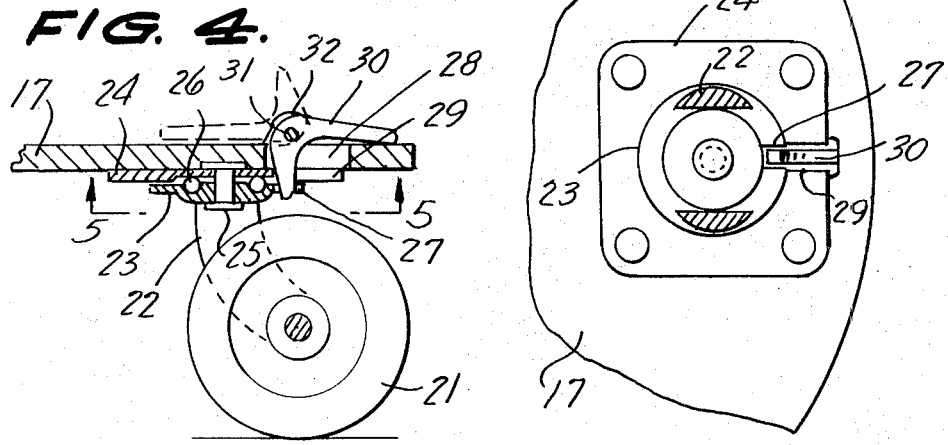

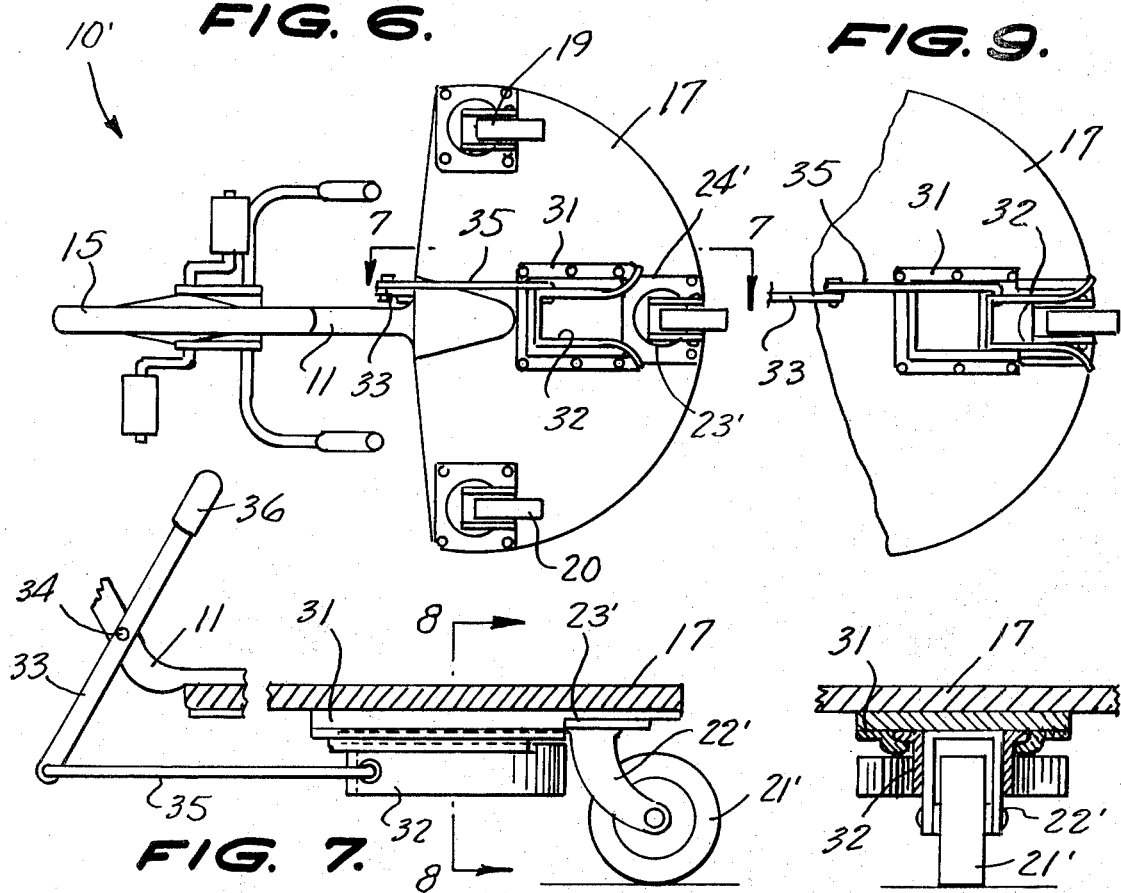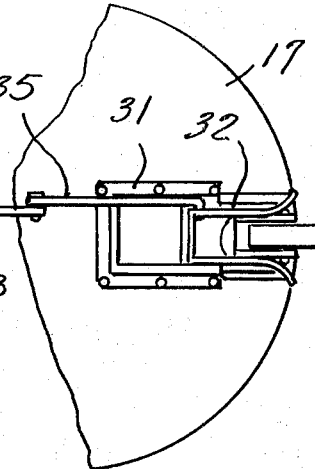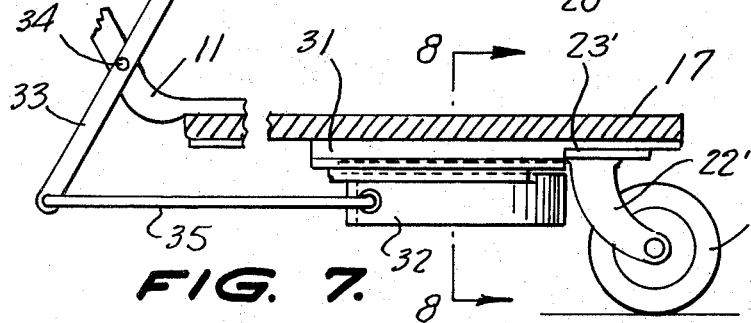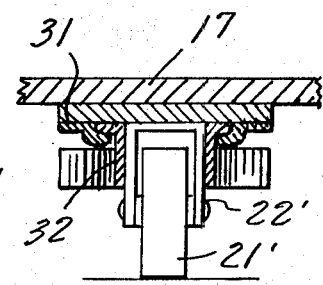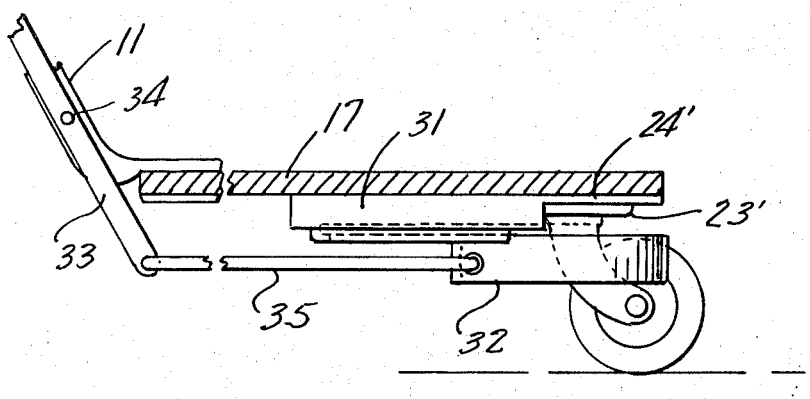

3,857,583

OCCUPANT PROPELLED QUADRACYCLE

BACKGROUND OF THE INVENTION

Field of the Invention

The present invention relates to a quadracycle occupant propelled vehicle.

SUMMARY OF THE INVENTION

The quadracycle includes a frame supporting a steerable front wheel which is pedal driven. The rear of the frame is supported on a pair of castering outrigger wheels and a castering rear wheel aligned with the front wheel. Hand actuated locking means is provided for locking the rear wheel in a straight line position with respect to the front wheel.

The primary object of the invention is to provide a quadracycle which is capable of compound movement or may be locked for straight forward movement as desired.

Other objects and advantages will become apparent in the following specification when considered in light of the attached drawings.

BRIEF DESCRIPTION OF THE DRAWINGS

FIG. 1 is a side elevation of the invention;

FIG. 2 is a rear elevation of the invention;

FIG. 3 is a bottom plan view of the invention;

FIG. 4 is an enlarged fragmentary vertical sectional view, taken along the line 4—4 of FIG. 2, looking in the direction of the arrows;

FIG. 5 is a fragmentary horizontal sectional view, taken along the line 5—5 of FIG. 4, looking in the direction of the arrows;

FIG. 6 is a bottom plan view of a modified form of the invention;

FIG. 7 is an enlarged fragmentary vertical sectional view, taken along the line 7—7 of FIG. 6, looking in the direction of the arrows;

FIG. 8 is a fragmentary transverse sectional view, taken along the line 8—8 of FIG. 7, looking in the direction of the arrows;

FIG. 9 is a view similar to FIG. 6 with the lock engaged; and

FIG. 10 is a view similar to FIG. 7 with the lock engaged.

DESCRIPTION OF THE PREFERRED EMBODIMENTS

Referring now to the drawings in detail, wherein like reference characters indicate like parts throughout the several figures, the reference numeral 10 indicates generally a quadracycle constructed in accordance with the invention.

The quadracycle 10 includes a frame 11 having a journal 12 rigidly mounted on the upper forward end thereof. Forks 13 are mounted in the journal 12 and have handlebars 14 secured thereto. A front wheel 15 is journalled in the fork 13 and have crank mounted pedals 16 attached thereto for occupant propulsion of the quadracycle 10.

A flat plate 17 is secured to the lower rear portion of the frame 11 and is generally parallel to the supporting surface. A seat 18 is secured to the plate 17 by any desired means which may be adjustable if desired.

An outrigger caster wheel 19 is mounted on the plate 17 adjacent one side edge thereof. A second outrigger caster wheel 20 is mounted on the plate 17 on the other side edge thereof in generally transversely aligned relation with the outrigger wheel 19. A rear wheel 21 is mounted in forks 22 depending from a bearing plate 23. A mounting plate 24 is secured to the bearing plate 23 by a pivot pin 25. Ballbearings 26 are positioned between the bearing plate 23 and the mounting plate 24 so that the wheel 21 may caster around the pivot pin 25 as desired.

A slot 27 is formed in the bearing plate 23 in aligned relation with a slot 28 formed in the plate 17. A slot 29 is formed in the support plate 24 in aligned relation to the slots 27, 28. An L-shaped latch bar 30 is pivotally mounted on a pivot pin 31 to a pair of ears 32 secured to the plate 17 and extending upwardly therefrom. The latch bar 30 when in latching position extends downwardly through the slots 28, 29 and into the slot 27 to lock the fork 22 against pivotal movement about the pivot pin 25. The wheel 21 is arranged in aligned relation with the wheel 15 when the latch bar 30 is in locking position.

In the use and operation of the invention the quadracycle is propelled and steered by the occupant by driving and controlling the front wheel 15 if the latch bar 30 is unlatched the rear of the quadracycle 10 moves in unpredictable patterns not completely of the control of the user. When the quadracycle 10 has the rear wheel 21 latched as shown in FIG. 4 the quadracycle 10 will move in a regular manner fully under the control of the occupant with the rear wheel 21 tracking the front wheel 15.

In FIGS. 6 through 10 a modified form of latch is provided for preventing rotation of the rear wheel. The quadracycle 10' includes a frame 11 supporting a pedal driven front wheel 15 at one end and the plate 17 at the other end. Outrigger castering wheels 19 and 20 support the outer edges of the plate 17 and a rear wheel 21' is secured to the rear of the plate 17 in a set of forks 22' carried by a bearing plate 23' pivotally secured to a mounting plate 24'.

A track plate 31 is secured to the underside of the plate 17 and has a U-shaped latch member 32 slidably mounted therein for movement rearwardly into snug engagement with the opposite sides of the forks 22' to prevent rotation of the forks 22' on the support plate 24'.

A hand lever 33 is mounted by a pivot pin 34 to the frame 11 and has a link 35 extending rearwardly and engaging the latch member 32. A handle 36 on the upper end of the lever 33 is provided for the occupant of the quadracycle 10' to move the latch member 32 into and out of locking engagement with the forks 22'.

The use and operation of the modified quadracycle 10' is identical to that of the form of the invention illustrated in FIGS. 1 through 5.

Having thus described the preferred embodiment of the invention it should be understood that numerous structural modifications and adaptations may be resorted to without departing from the spirit of the invention.

What is claimed is:

1. A quadracycle comprising a frame, a steerable front wheel mounted in said frame, a generally horizontal plate secured to the rear of said frame, a pair of castering outrigger wheels supporting the opposed side edges of said plate, a rear wheel, means mounting said rear wheel on said plate for castering about a vertical pivot, and means movably mounted on said plate for latching said rear wheel against castering movement.

2. A device as claimed in claim 1 wherein said rear wheel includes a bearing plate having a pair of forks secured thereto and depending therefrom with said rear wheel journalled in said forks.

3. A device as claimed in claim 2 wherein said means latching said rear wheel against castering movement comprises a generally L-shaped latch bar pivotally mounted on said plate and selectively engageable in a slot in said bearing plate to prevent rotation of said bearing plate and thus castering of said rear wheels.

4. A device as claimed in claim 2 wherein the means for preventing castering of said rear wheel comprises a U-shaped latch member slidably mounted on said plate for latching engagement with the forks of said rear wheel, and means extending to a hand actuated lever for moving said latching member into and out of latching engagement with said forks.

* * * * *